United States Patent
Karolys et al.

[11] Patent Number: 5,934,610
[45] Date of Patent: Aug. 10, 1999

[54] VIBRATION MONITORING SYSTEM FOR MULTIPLE AIRCRAFT ENGINES

[75] Inventors: Alexis Gabriel Karolys, San Clemente; Fernando Francisco GenKuong, Laguna Niguel, both of Calif.

[73] Assignee: Endevco Corporation, San Juan Capistrano, Calif.

[21] Appl. No.: 08/949,461

[22] Filed: Oct. 14, 1997

[51] Int. Cl.$^6$ ............................................. G01L 3/26
[52] U.S. Cl. ..................... 244/53 R; 244/1 R; 244/54; 73/116; 73/117.2
[58] Field of Search .................. 244/1 R, 53 R, 244/54, 17.13; 439/105, 188, 365, 507, 682, 692; 73/116, 117.2

[56] References Cited

U.S. PATENT DOCUMENTS

| | | | |
|---|---|---|---|
| 3,229,240 | 1/1966 | Harrison, Sr. et al. | 439/692 |
| 4,410,230 | 10/1983 | SanMiguel | 439/682 |
| 4,488,240 | 12/1984 | Kapadia et al. | 364/508 |
| 4,608,650 | 8/1986 | Kapadia | 364/508 |
| 4,697,864 | 10/1987 | Hayes et al. | 439/692 |
| 4,935,846 | 6/1990 | Karolys et al. | 361/391 |
| 5,150,855 | 9/1992 | Kaptein | 244/1 N |
| 5,295,641 | 3/1994 | Kaptein | 244/1 N |
| 5,496,196 | 3/1996 | Schachtebeck | 439/682 |
| 5,511,944 | 4/1996 | Ide et al. | 244/17.13 |
| 5,551,649 | 9/1996 | Kaptein | 244/1 N |

*Primary Examiner*—Charles T. Jordan
*Assistant Examiner*—Charles R. Ducker, Jr.
*Attorney, Agent, or Firm*—Stetina Brunda Garred & Brucker

[57] ABSTRACT

An aircraft engine vibration analysis system is provided with at least one vibration sensor disposed proximate an aircraft engine. The analysis system is further provided with a vibration analysis module for receiving an input from the vibration sensor and generating an output representative of vibration characteristics of the aircraft engine. The analysis module is provided with a multiple pin input port which is connectable to the vibration sensor. The analysis module is further provided with test sequence select circuity which is in electrical communication with the input port for implementing an appropriate vibration analysis sequence in response to measured conductivity between pins of the multiple pin input port. The analysis system is further provided with a sensor connecting cable which is connectable to the vibration sensor and the analysis module input port. The connecting cable is provided with a multiple pin cable connector, the pins of which having conductivity characteristics corresponding to a vibration analysis sequence associated with a dedicated aircraft engine type.

23 Claims, 1 Drawing Sheet

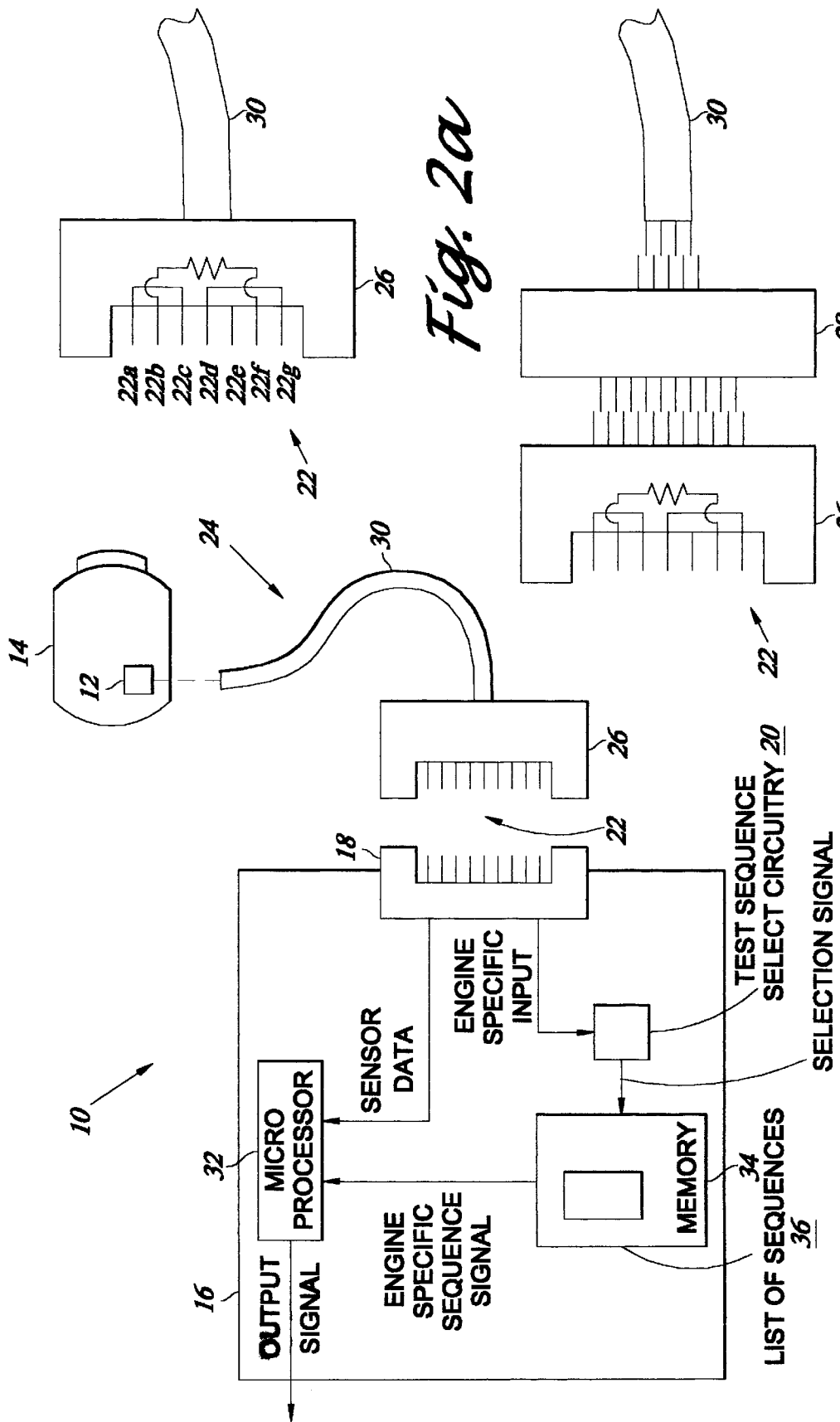

VIBRATION MONITORING SYSTEM FOR MULTIPLE AIRCRAFT ENGINES

FIELD OF THE INVENTION

This invention generally relates to a vibration monitoring system, and in particular to a vibration monitoring system which utilizes different connection devices to identify and monitor various aircraft engines.

Background of the Invention

In light of ever increasing Federal Aviation Authority and other Governmental regulations and recent high profile aircraft disasters, all aspects of aircraft safety have come under close scrutiny.

The modern jet engine includes several concentrically mounted shafts, each rotating at a slightly different frequency. Each of the rotating shafts or spools can include a compressor-turbine assembly which in turn includes fan and turbine blades. In the intake stages the blades are used to compress incoming air, and in the output stages the blades drive the compressor.

Machinery having massive rotating components, such as jet aircraft engines, may experience shaft bearings or shaft housing failures. In addition, these rotating components may become unbalanced and impose loads upon the bearings and housing well beyond acceptable specifications. These problems may be a result of any variety of causes which include, manufacturing defects, design defects, wear, misuse, accidental damages and the like. In the case of an aircraft while in operation, failure of these engine components can lead to, not only engine loss, but catastrophic loss of aircraft.

Vibration amplitudes and patterns, induced by the rotation of jet engine sub-components, are indicative of sub-component degradation and decreased reliability. Various techniques have evolved in the art to detect and analyze engine sub-component vibration amplitudes and patterns (for example, see prior patent to Kapadia et al., U.S. Pat. No. 4,488,240 of Dec. 11, 1994). Systems employing these techniques may include various hardware and circuitry which may include, micro processors, multiplexers, analog signal conditioning circuitry, analog to digital signal converters, digital filters, digital to analog signal converter of output and a variety of memory chips. These techniques also assist in the balancing of the rotating components to keep vibration at acceptable low levels (for example, see prior patent to Kapadia, U.S. Pat. No. 4,608,650). Limiting vibration has long been deemed a factor in prolonging the life of the bearings and other engine component parts. Thus, vibration detection is not only an invaluable safety tool used to monitor engines while in operation, but has been incorporated into scheduled engine maintenance procedures.

Analysis of detected vibration signals may utilize a specification of acceptable vibration amplitudes and patterns. A given vibration specification corresponds to a given engine model and type. Accordingly, a component of a system to analyze engine vibrations may include stored engine specific data.

Typically, a vibration analysis system consists of an analysis module which is connected to a generic vibration sensor located at the engine. In addition, the analysis module must access engine specific data for comparison and analysis. The analysis module may be integrally installed in an aircraft for monitoring vibrations during operation. The analysis module may be located in the engine housing or located somewhere else in the aircraft. The design considerations of the location of the analysis module may take into account optimal vibration sampling considerations and space constraints. Alternatively, the analysis module may be a portable unit which is connected to the generic vibration sensor located in the engine. Typically, such a portable analysis module would be used for engine inspection and maintenance while the aircraft is on the ground for servicing and may be located on a servicing cart, for example.

A conventional system configuration employs a generic analysis module which mates with an engine specific insert unit containing the vibration specification data corresponding a given engine model and type. In the case of a portable analysis module which is used for groundbased servicing of a variety of aircraft with a variety of engine types, the user is burdened with the requirement to purchase a variety of engine specific insert units.

Another conventional system approach employs a generic analysis module which has a stored library of vibration specifications corresponding to a variety of engine models and types. Such a generic analysis module is provided with a selection device through which the operator inputs the engine type, thereby informing the analysis module which set of engine specifications to use for analysis. This selection device may be a dial with various settings corresponding to a given engine type or a key pad which a user types in a specific code corresponding to a given engine type. This system, however, is subject to user errors in correctly setting the system to the particular engine type because of the nature of the selection device used. For example, where the system is used to service multiple aircraft on the ground, each time the user services a different aircraft, the user must input through the selection device which engine type the system is connected to. In the case of a dial type selection device, the user is required to turn the dial to the setting corresponding to the appropriate engine type. This task is subject to user error, as the user may be inattentive while setting the dial or may simply forget to change the setting of the dial completely. In the case of a key pad type selection device, the user is required to key-in code corresponding to a given engine type. Similarly, this task is subject to user error, as the user may be inattentive while keying-in the appropriate engine type code or may key-in the code from memory (which of course is fallible).

Another system approach employs a configuration having an engine specific analysis module with engine specific data being integral to the module. In the case of a portable analysis module which is used for ground-based servicing of a variety of aircraft with a variety of engine types, the user burdened with the requirement of purchasing numerous analysis modules for each engine type. Moreover, the analysis module is the most expensive system component. In addition, regardless of whether the engine specific analysis module is integral to an aircraft or portable used to service a variety of aircraft, this configuration requires a manufacturer to produce a multitude of different analysis modules, rather than a single generic one. Such a manufacturing requirement imposes added product costs.

It is therefore evident that there exists a need in the art for engine vibration detection system which requires a minimal amount of intrusion into the aircraft for accessing installed system components, mitigates component part redundancy, and minimizes component user and manufacturer costs.

SUMMARY OF THE INVENTION

The present invention specifically addresses the above-mentioned deficiencies associated with the prior art. More particularly, in accordance with the present invention, an aircraft engine vibration analysis system is provided with at least one vibration sensor disposed proximate an aircraft engine. The analysis system is further provided with a vibration analysis module for receiving an input from the vibration sensor and generating an output representative of vibration characteristics of the aircraft engine. The analysis module is provided with a multiple pin input port which is connectable to the vibration sensor. The analysis module is further provided with test sequence select circuitry which is in electrical communication with the input port for implementing an appropriate vibration analysis sequence in response to measured conductivity between pins of the multiple pin input port. The analysis system is further provided with a sensor connecting cable which is connectable to the vibration sensor and the analysis module input port. The connecting cable is provided with a multiple pin cable connector, the pins of which having conductivity characteristics corresponding to a vibration analysis sequence associated with a dedicated aircraft engine type.

In addition, it is preferred that the connecting cable is provided with an adaptor portion and a cable portion. The adaptor portion is disposed between the cable portion and the analysis module input port. The adaptor portion is engageable/disengageable from the cable portion. In the preferred embodiment, the adaptor portion is pin engageable with the cable portion.

In the preferred embodiment of the present invention, the analysis module is further provided with a memory, wherein a list of predefined vibration analysis sequences is stored and selection of a particular analysis sequence from the stored list being dependent upon a selection signal from the test sequence selection circuity. The analysis module is further provided with a micro processor which is adapted to receive sensor data and operates on the sensor data in accordance with a selected analysis sequence from the memory.

In addition, in one embodiment of the present invention, wherein the multiple pin input port, at least two of the pins being electrically shorted. Similarly, in another embodiment of the present invention, at least two of the pins are electrically open.

Advantageously, where the vibration analysis system of the present invention is used to inspect a variety of aircraft on the ground, user errors associated with configuring the system to analyze a particular engine type are mitigated. In order to verify that the appropriate engine type analysis sequence is performed, the user needs only to inspect the particular sensor connecting cable being used. It is contemplated that the particular adaptor cable would have indicia corresponding to the particular engine type the multiple pin cable connector is encoded. Thus, this configuration mitigates user error problems associated with those prior art system configurations which employ a generic analysis module with engine specific insert units, as well as those which require the user to manually set the system to access the specific engine type data.

In addition, the system configuration of the present invention allows for a single generic analysis module to be utilized for monitoring or analyzing a variety of aircraft having a variety of engine types. Analysis of multiple engine types is achieved with a single generic analysis module and the corresponding engine specific cable connector of the sensor connecting cable.

Thus, where the user utilizes the system to service a variety of aircraft with a variety of engines, the user needs only to purchase a single analysis module (the most expensive vibration analysis system component) and the appropriate sensor connecting cables (which are relatively low cost). Even more cost effective, in the preferred embodiment, the sensor connection cable is provided with an adaptor portion with the engine specific multiple pin cable connector and a cable portion. In this embodiment, the user need only to purchase a single analysis module, a single cable portion of the connecting cable and the appropriate multiple pin connectors. It is contemplated that the pin connectors are relatively low cost in comparison the cable portion and especially to the analysis module.

Conveniently, the present invention allows a manufacturer to produce generic analysis modules. Engine specific system component parts only include the adaptor cables, and in the preferred embodiment only the cable connectors.

It is also contemplated that a generic adaptor cable may be available to the user with instructions to selectively short the pins of the cable connector, thereby encoding the cable connector. Presumably, such generic connector cables would cost less to the user than manufacturer produced engine specific connector cables.

Accordingly, based upon the foregoing, the engine vibration detection system of the present invention represents an advance of art.

BRIEF DESCRIPTION OF THE DRAWINGS

An illustrative and presently preferred embodiment of the invention is shown in the accompanying drawings in which:

FIG. 1 schematically illustrates a vibration analysis system of the present invention;

FIG. 2a schematically illustrates exploded view of the cable connector with a portion of a connecting cable; and FIG. 2b schematically illustrates exploded view of the cable connector with a portion of a connecting cable of the preferred embodiment of the present invention.

DETAILED DESCRIPTION OF THE PREFERRED EMBODIMENT

Referring now to the drawings wherein in the showings are for purposes of illustrating a preferred embodiment of the present invention only, and not for purposes of limiting the same, FIG. 1 schematically illustrates an engine vibration analysis system 10 constructed in accordance with the present invention for analyzing vibrations of a variety of aircraft engines.

In accordance with the present invention, an aircraft engine vibration analysis system 10 is provided with at least one vibration sensor 12 disposed proximate an aircraft engine 10. The analysis system 10 is further provided with a vibration analysis module 16 for receiving an input from the vibration sensor 12 and generating an output representative of vibration characteristics of the aircraft engine. The analysis module 16 is provided with a multiple pin input port 18 which is connectable to the vibration sensor 12. It is contemplated that the vibration sensor 12 is capable of sensing any one of engine rotation frequency, vibration amplitude and vibration patterns and combinations thereof.

The analysis module 16 is further provided with test sequence select circuity 20 which is in electrical communication with the input port 18 for implementing an appropriate vibration analysis sequence in response to measured conductivity between pins 22 of the multiple pin input port 18.

The analysis system 10 is further provided with a sensor connecting cable 24 which is connectable to the vibration sensor 12 and the analysis module input port 18. The connecting cable 24 is provided with a multiple pin cable connector 26 having recognizable electrical characteristics (e.g., selective opens and/or shorts between pins 22) corresponding to a vibration analysis sequence associated with a dedicated aircraft engine type. A given cable connector 26 is provided with electrical characteristics that are uniquely associated with a particular engine type and/or model. Accordingly, identification of a particular characteristics of cable connector 26 inherently provides like identification of a particular analysis sequence corresponding to a designated engine type, i.e., engine 14. Referring now to FIG. 2a, the cable connector 26 is depicted with pins 22 (for illustration, the pins 22 are individually identified as 22a–g). As depicted, pin 22a is shorted to pin 22c, pin 22d is shorted to 22g, pin 22e is open to all of the other pins, and pins 22b and 22f have a resistor disposed there between.

In one embodiment, shown at FIG. 2b, the connecting cable 24 is formed to include an adaptor portion 28 and a separately connectable cable portion 30. The adaptor portion 28 is disposed between the cable portion 30 and the cable connector 26, incorporating the recognizable electrical characteristics. The adaptor portion 28 may be engageable/disengageable (i.e., pin connectable) to the cable portion 30 and the cable connector 26. Identification of the electrical characteristics of cable connector 26, likewise, inherently provides identification of the particular analysis appropriate to engine 14, connected thereto. Thus, selection of an appropriate cable connector 26 or connecting cable 24, as the case may be, causes identification of the analysis sequence for that particular engine type.

In the preferred embodiment of the present invention, the analysis module 16 is further provided with a memory 34, wherein a list of predefined vibration analysis sequences 36 is stored and selection of a particular analysis sequence from the stored list 36 being dependent upon a selection signal from the test sequence selection circuity 20. The analysis module 16 is further provided with a micro processor 32 which is adapted to receive sensor data and operates on the sensor data in accordance with a selected analysis sequence from the memory 34.

In addition, in one embodiment of the present invention, wherein the multiple pin cable connector 26, at least two of the pins 22 being electrically shorted. Similarly, in another embodiment of the present invention, at least two of the pins 22 are electrically open.

Indicia indicative of the particular engine type to be analyzed are preferably provided to facilitate easy selection of the appropriate cable connector 26 or connecting cable 24, as the case may be. Such indicia preferably comprise name, color coding, drawing, or other graphical representation formed on the cable connector 26 or connecting cable 24 identifying the engine type which can be analyzed by connecting that cable connector 26 or connecting cable 24 to the vibration analysis module 16. The user merely visually compares the identifying indicia to the engine type to be analyzed and then selects the appropriate cable connector 26 or connecting cable 24, as the case may be. The indicia may also be correlated with engine type on a sheet or chart proximate the vibration analysis module 16 for conveniently selecting and verifying use of the appropriate cable connector 26 or connecting cable 24 as a whole, as the case may be.

It is contemplated that the test sequence select circuity 20 senses electrical characteristic of the pins 22 of a given cable connector 26 (i.e., open and shorted connections of the pins or resistance level between pins 22). Thus, the specific engine type vibration analysis sequence to be performed by the analysis module 16 is encoded into a given cable connector 26 or connecting cable 24 by, for example, selectively shorting pins to ground. It is contemplated that the test sequence select circuity 20 may sense other electrical characteristics, other than conductivity or resistance. For example, voltage may be sensed by the select circuity 20. In such a case, a unique measurable voltage or voltage pattern would serve to identify the appropriate analysis sequence.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. An aircraft engine vibration analysis system comprising:
   at least one vibration sensor disposed proximate an aircraft engine;
   a vibration analysis module for receiving an input from the vibration sensor and generating an output representative of vibration characteristics of the aircraft engine, the analysis module comprising a multiple pin input port connectable to the vibration sensor and test sequence select circuity in electrical communication with the input port for implementing an appropriate vibration analysis sequence in response to measured conductivity between pins of the multiple pin input port; and
   a sensor connecting cable connectable to the vibration sensor and the analysis module input port, the connecting cable having a multiple pin cable connector, the pins of which having conductivity characteristics corresponding to a vibration analysis sequence associated with a dedicated aircraft engine type.

2. The aircraft engine vibration analysis system of claim 1 wherein the connecting cable comprises an adaptor portion and a cable portion, the adaptor portion being disposed between the cable portion and the cable connector, the adaptor portion being engageable/disengageable from the cable portion.

3. The aircraft engine vibration analysis system of claim 2 wherein the adaptor portion being pin engageable with the cable portion.

4. The aircraft engine vibration analysis system of claim 1 wherein the analysis module further comprising:
   a memory, wherein a list of predefined vibration analysis sequences is stored and selection of a particular analysis sequence from the stored list being dependent upon a selection signal from the test sequence selection circuity; and
   a micro processor is adapted to receive sensor data and operates on the sensor data in accordance with a selected analysis sequence from the memory.

5. The aircraft engine vibration analysis system of claim 1 wherein the multiple pin input port at least two of the pins being electrically shorted.

6. The aircraft engine vibration analysis system of claim 1 wherein the multiple pin input port at least two of the pins being electrically open.

7. The aircraft engine vibration analysis system of claim 1 wherein the multiple pin cable connector at least two of the pins being electrically shorted.

8. The aircraft engine vibration analysis system of claim 1 wherein the multiple pin cable connector at least two of the pins being electrically open.

9. The aircraft engine vibration analysis system of claim 1 wherein said appropriate vibration analysis sequence corresponding to a vibration analysis sequence associated with a dedicated aircraft engine type.

10. An aircraft engine vibration analysis system comprising:
   at least one vibration sensor disposed proximate an aircraft engine;
   a vibration analysis module for receiving an input from the vibration sensor and generating an output representative of vibration characteristics of the aircraft engine, the analysis module comprising a multiple pin input port connectable to the vibration sensor and test sequence select circuity in electrical communication with the input port for implementing an appropriate vibration analysis sequence in response to measured conductivity between pins of the multiple pin input port, at least two of the pins being electrically shorted; and
   a sensor connecting cable connectable to the vibration sensor and the analysis module input port, the connecting cable having a multiple pin cable connector, the pins of which having conductivity characteristics corresponding to a vibration analysis sequence associated with a dedicated aircraft engine type.

11. The aircraft engine vibration analysis system of claim 10 wherein the connecting cable comprises an adaptor portion and a cable portion, the adaptor portion being disposed between the cable portion and the cable connector, the adaptor portion being engageable/disengageable from the cable portion.

12. The aircraft engine vibration analysis system of claim 11 wherein the adaptor portion being pin engageable with the cable portion.

13. The aircraft engine vibration analysis system of claim 10 wherein the analysis module further comprising:
   a memory, wherein a list of predefined vibration analysis sequences is stored and selection of a particular analysis sequence from the stored list being dependent upon a selection signal from the test sequence selection circuity; and
   a micro processor is adapted to receive sensor data and operates on the sensor data in accordance with a selected analysis sequence from the memory.

14. The aircraft engine vibration analysis system of claim 11 wherein the multiple pin cable connector at least two of the pins being electrically shorted.

15. The aircraft engine vibration analysis system of claim 11 wherein the multiple pin cable connector at least two of the pins being electrically open.

16. The aircraft engine vibration analysis system of claim 11 wherein said appropriate vibration analysis sequence corresponding to a vibration analysis sequence associated with a dedicated aircraft engine type.

17. An aircraft engine vibration analysis system comprising:
   at least one vibration sensor disposed proximate an aircraft engine;
   a vibration analysis module for receiving an input from the vibration sensor and generating an output representative of vibration characteristics of the aircraft engine, the analysis module comprising a multiple pin input port connectable to the vibration sensor and test sequence select circuity in electrical communication with the input port for implementing an appropriate vibration analysis sequence in response to measured conductivity between pins of the multiple pin input port, at least two of the pins being electrically open; and
   a sensor connecting cable connectable to the vibration sensor and the analysis module input port, the connecting cable having a multiple pin cable connector, the pins of which having conductivity characteristics corresponding to a vibration analysis sequence associated with a dedicated aircraft engine type.

18. The aircraft engine vibration analysis system of claim 17 wherein the connecting cable comprises an adaptor portion and a cable portion, the adaptor portion being disposed between the cable portion and the cable connector, the adaptor portion being engageable/disengageable from the cable portion.

19. The aircraft engine vibration analysis system of claim 18 wherein the adaptor portion being pin engageable with the cable portion.

20. The aircraft engine vibration analysis system of claim 17 wherein the analysis module further comprising:
   a memory, wherein a list of predefined vibration analysis sequences is stored and selection of a particular analysis sequence from the stored list being dependent upon a selection signal from the test sequence selection circuity; and
   a micro processor is adapted to receive sensor data and operates on the sensor data in accordance with a selected analysis sequence from the memory.

21. The aircraft engine vibration analysis system of claim 17 wherein the multiple pin cable connector at least two of the pins being electrically shorted.

22. The aircraft engine vibration analysis system of claim 17 wherein the multiple pin cable connector at least two of the pins being electrically open.

23. The aircraft engine vibration analysis system of claim 17 wherein said appropriate vibration analysis sequence corresponding to a vibration analysis sequence associated with a dedicated aircraft engine type.

* * * * *